(12) United States Patent
Gratton

(10) Patent No.: US 8,606,085 B2
(45) Date of Patent: Dec. 10, 2013

(54) METHOD AND APPARATUS FOR REPLACEMENT OF AUDIO DATA IN RECORDED AUDIO/VIDEO STREAM

(75) Inventor: Max S. Gratton, Lakewood, CO (US)

(73) Assignee: DISH Network L.L.C., Englewood, CO (US)

( * ) Notice: Subject to any disclaimer, the term of this patent is extended or adjusted under 35 U.S.C. 154(b) by 999 days.

(21) Appl. No.: 12/052,623

(22) Filed: Mar. 20, 2008

(65) Prior Publication Data

US 2009/0238536 A1    Sep. 24, 2009

(51) Int. Cl.
*H04N 7/025* (2006.01)
*H04N 7/16* (2011.01)
*H04N 9/64* (2006.01)

(52) U.S. Cl.
USPC ............ 386/285; 386/287; 725/28; 725/32; 725/138; 725/34; 348/468; 348/715; 348/718

(58) Field of Classification Search
USPC ................. 386/96, 287; 725/28, 32, 138, 34; 348/468, 715, 718
See application file for complete search history.

(56) References Cited

U.S. PATENT DOCUMENTS

| | | |
|---|---|---|
| 3,682,363 A | 8/1972 | Hull |
| 3,919,479 A | 11/1975 | Moon |
| 3,942,190 A | 3/1976 | Detweiler |
| 4,224,481 A | 9/1980 | Russell |
| 4,313,135 A | 1/1982 | Cooper |
| 4,331,974 A | 5/1982 | Cogswell et al. |
| 4,388,659 A | 6/1983 | Lemke |
| 4,404,589 A | 9/1983 | Wright, Jr. |
| 4,408,309 A | 10/1983 | Kiesling et al. |
| 4,439,785 A | 3/1984 | Leonard |
| 4,450,531 A | 5/1984 | Kenyon |
| 4,520,404 A | 5/1985 | Von Kohorn |
| 4,602,297 A | 7/1986 | Reese |
| 4,605,964 A | 8/1986 | Chard |
| 4,633,331 A | 12/1986 | McGrady et al. |
| 4,665,431 A | 5/1987 | Cooper |

(Continued)

FOREIGN PATENT DOCUMENTS

| | | |
|---|---|---|
| EP | 521454 | 1/1993 |
| EP | 594241 | 4/1994 |

(Continued)

OTHER PUBLICATIONS

OA mailed on May 24, 2010 for US App. No. 11/942,896, filed Nov. 20, 2007 in the name of Hodge.

(Continued)

*Primary Examiner* — Brian Shaw
(74) *Attorney, Agent, or Firm* — Ingrassia Fisher & Lorenz, P.C.

(57) ABSTRACT

A method for replacing audio data within a recorded audio/video stream is presented. In the method, a first audio/video stream including audio data, video data, and supplemental data is stored. Location information is received which references the supplemental data to identify a location within the first audio/video stream. The location information is received in a data file separately from the first audio/video stream. Also received is an audio data segment. At least a portion of the audio data of the first audio/video stream is replaced at the identified location with the audio data segment to produce a second audio/video stream. At least a portion of the second audio/video stream is then transferred for presentation.

12 Claims, 6 Drawing Sheets

(56) References Cited

U.S. PATENT DOCUMENTS

| | | |
|---|---|---|
| 4,697,209 A | 9/1987 | Kiewit |
| 4,706,121 A | 11/1987 | Young |
| 4,739,398 A | 4/1988 | Thomas |
| 4,750,213 A | 6/1988 | Novak |
| 4,755,889 A | 7/1988 | Schwartz |
| 4,760,442 A | 7/1988 | O'Connell et al. |
| 4,761,694 A | 8/1988 | Shudo et al. |
| 4,789,961 A | 12/1988 | Tindall |
| 4,805,217 A | 2/1989 | Morihiro et al. |
| 4,816,905 A | 3/1989 | Tweedy et al. |
| 4,833,710 A | 5/1989 | Hirashima |
| 4,876,670 A | 10/1989 | Nakabayashi |
| 4,888,769 A | 12/1989 | Deal |
| 4,891,715 A | 1/1990 | Levy |
| 4,897,867 A | 1/1990 | Foster et al. |
| 4,916,682 A | 4/1990 | Tomoda et al. |
| 4,918,730 A | 4/1990 | Schulze |
| 4,920,533 A | 4/1990 | Dufresne et al. |
| 4,930,160 A | 5/1990 | Vogel |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,190 A | 11/1990 | Primeau et al. |
| 4,974,085 A | 11/1990 | Campbell et al. |
| RE33,535 E | 2/1991 | Cooper |
| 4,991,033 A | 2/1991 | Takeshita |
| 5,014,125 A | 5/1991 | Pocock et al. |
| 5,057,932 A | 10/1991 | Lang |
| 5,063,453 A | 11/1991 | Yoshimura et al. |
| 5,093,718 A | 3/1992 | Hoarty et al. |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,168,353 A | 12/1992 | Walker |
| 5,191,410 A | 3/1993 | McCalley et al. |
| 5,202,761 A | 4/1993 | Cooper |
| 5,227,876 A | 7/1993 | Cucchi et al. |
| 5,233,423 A | 8/1993 | Jernigan et al. |
| 5,241,428 A | 8/1993 | Goldwasser et al. |
| 5,245,430 A | 9/1993 | Nishimura |
| 5,247,347 A | 9/1993 | Litteral et al. |
| 5,253,275 A | 10/1993 | Yurt et al. |
| 5,311,423 A | 5/1994 | Clark |
| 5,329,320 A | 7/1994 | Yifrach |
| 5,333,091 A | 7/1994 | Iggulden et al. |
| 5,357,276 A | 10/1994 | Banker et al. |
| 5,361,261 A | 11/1994 | Edem et al. |
| 5,371,551 A | 12/1994 | Logan et al. |
| 5,412,416 A | 5/1995 | Nemirofsky |
| 5,414,455 A | 5/1995 | Hooper et al. |
| 5,434,678 A | 7/1995 | Abecassis |
| 5,438,423 A | 8/1995 | Lynch |
| 5,440,334 A | 8/1995 | Walters et al. |
| 5,442,390 A | 8/1995 | Hooper et al. |
| 5,442,455 A | 8/1995 | Hioki et al. |
| 5,452,006 A | 9/1995 | Auld |
| 5,453,790 A | 9/1995 | Vermeulen et al. |
| 5,461,415 A | 10/1995 | Wolf et al. |
| 5,461,428 A | 10/1995 | Yoo |
| 5,477,263 A | 12/1995 | O'Callaghan et al. |
| 5,481,542 A | 1/1996 | Logston et al. |
| 5,508,940 A | 4/1996 | Rossmere et al. |
| 5,513,011 A | 4/1996 | Matsumoto et al. |
| 5,517,250 A | 5/1996 | Hoogenboom et al. |
| 5,521,630 A | 5/1996 | Chen et al. |
| 5,528,282 A | 6/1996 | Voeten et al. |
| 5,533,021 A | 7/1996 | Branstad et al. |
| 5,535,137 A | 7/1996 | Rossmere et al. |
| 5,535,229 A | 7/1996 | Hain, Jr. et al. |
| 5,537,408 A | 7/1996 | Branstad et al. |
| 5,541,919 A | 7/1996 | Yong et al. |
| 5,550,594 A | 8/1996 | Cooper et al. |
| 5,555,463 A | 9/1996 | Staron et al. |
| 5,555,555 A | 9/1996 | Sato et al. |
| 5,557,538 A | 9/1996 | Retter et al. |
| 5,557,541 A | 9/1996 | Schulhof et al. |
| 5,559,999 A | 9/1996 | Maturi et al. |
| 5,563,714 A | 10/1996 | Inoue et al. |
| 5,572,261 A | 11/1996 | Cooper |
| 5,574,662 A | 11/1996 | Windrem et al. |
| 5,581,479 A | 12/1996 | McLaughlin et al. |
| 5,583,561 A | 12/1996 | Baker et al. |
| 5,583,652 A | 12/1996 | Ware |
| 5,586,264 A | 12/1996 | Belknap et al. |
| 5,600,364 A | 2/1997 | Hendricks et al. |
| 5,603,058 A | 2/1997 | Belknap et al. |
| 5,604,544 A | 2/1997 | Bertram |
| 5,610,653 A | 3/1997 | Abecassis |
| 5,614,940 A | 3/1997 | Cobbley et al. |
| 5,619,337 A | 4/1997 | Naimpally |
| 5,625,464 A | 4/1997 | Compoint et al. |
| 5,629,732 A | 5/1997 | Moskowitz et al. |
| 5,642,171 A | 6/1997 | Baumgartner et al. |
| 5,648,824 A | 7/1997 | Dunn |
| 5,659,539 A | 8/1997 | Porter et al. |
| 5,664,044 A | 9/1997 | Ware |
| 5,668,948 A | 9/1997 | Belknap et al. |
| 5,675,388 A | 10/1997 | Cooper |
| 5,682,488 A | 10/1997 | Gleason et al. |
| 5,684,918 A | 11/1997 | Abecassis |
| 5,692,093 A | 11/1997 | Iggulden et al. |
| 5,696,866 A | 12/1997 | Iggulden et al. |
| 5,696,868 A | 12/1997 | Kim et al. |
| 5,696,869 A | 12/1997 | Abecassis |
| 5,701,383 A | 12/1997 | Russo et al. |
| 5,703,655 A | 12/1997 | Corey et al. |
| 5,706,388 A | 1/1998 | Isaka |
| 5,712,976 A | 1/1998 | Falcon, Jr. et al. |
| D390,839 S | 2/1998 | Yamamoto et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottesen et al. |
| D392,269 S | 3/1998 | Mason et al. |
| 5,724,474 A | 3/1998 | Oguro et al. |
| 5,742,730 A | 4/1998 | Couts et al. |
| 5,751,282 A | 5/1998 | Girard et al. |
| 5,751,883 A | 5/1998 | Ottesen et al. |
| 5,761,417 A | 6/1998 | Henley et al. |
| 5,774,170 A | 6/1998 | Hite et al. |
| 5,774,186 A | 6/1998 | Brodsky |
| 5,778,137 A | 7/1998 | Nielsen et al. |
| 5,805,763 A | 9/1998 | Lawler et al. |
| 5,805,821 A | 9/1998 | Saxena et al. |
| 5,808,607 A | 9/1998 | Brady et al. |
| 5,815,689 A | 9/1998 | Shaw et al. |
| 5,822,493 A | 10/1998 | Uehara et al. |
| 5,848,217 A | 12/1998 | Tsukagoshi et al. |
| 5,864,682 A | 1/1999 | Porter et al. |
| 5,870,553 A | 2/1999 | Shaw et al. |
| 5,889,915 A | 3/1999 | Hewton |
| 5,892,536 A | 4/1999 | Logan |
| 5,892,884 A | 4/1999 | Sugiyama et al. |
| 5,899,578 A | 5/1999 | Yanagihara et al. |
| 5,920,572 A | 7/1999 | Washington et al. |
| 5,930,444 A | 7/1999 | Camhi et al. |
| 5,930,493 A | 7/1999 | Ottesen et al. |
| 5,949,954 A | 9/1999 | Young et al. |
| 5,953,485 A | 9/1999 | Abecassis |
| 5,956,716 A | 9/1999 | Kenner et al. |
| 5,973,679 A | 10/1999 | Abbott et al. |
| 5,987,210 A | 11/1999 | Iggulden et al. |
| 5,995,709 A | 11/1999 | Tsuge |
| 5,999,688 A | 12/1999 | Iggulden et al. |
| 5,999,689 A | 12/1999 | Iggulden |
| 5,999,691 A | 12/1999 | Takagi et al. |
| 6,002,443 A | 12/1999 | Iggulden |
| 6,002,832 A | 12/1999 | Yoneda |

(56) References Cited

U.S. PATENT DOCUMENTS

| | | | |
|---|---|---|---|
| 6,005,562 A | 12/1999 | Shiga et al. |
| 6,005,564 A | 12/1999 | Ahmad et al. |
| 6,005,603 A | 12/1999 | Flavin |
| 6,018,612 A | 1/2000 | Thomason et al. |
| 6,028,599 A | 2/2000 | Yuen et al. |
| 6,055,495 A | 4/2000 | Tucker et al. |
| D424,543 S | 5/2000 | Hodgson |
| 6,057,893 A | 5/2000 | Kojima et al. |
| D426,208 S | 6/2000 | Hodgson |
| D426,209 S | 6/2000 | Hodgson |
| 6,088,455 A | 7/2000 | Logan |
| 6,091,886 A | 7/2000 | Abecassis |
| RE36,801 E | 8/2000 | Logan et al. |
| 6,100,941 A | 8/2000 | Dimitrova et al. |
| 6,112,226 A | 8/2000 | Weaver et al. |
| 6,138,147 A | 10/2000 | Weaver et al. |
| 6,151,444 A | 11/2000 | Abecassis |
| 6,163,644 A | 12/2000 | Owashi et al. |
| 6,167,083 A | 12/2000 | Sporer et al. |
| 6,169,843 B1 | 1/2001 | Lenihan et al. |
| 6,192,189 B1 | 2/2001 | Fujinami et al. |
| 6,198,877 B1 | 3/2001 | Kawamura et al. |
| 6,208,804 B1 | 3/2001 | Ottesen et al. |
| 6,208,805 B1 | 3/2001 | Abecassis |
| 6,226,447 B1 | 5/2001 | Sasaki et al. |
| 6,232,926 B1 | 5/2001 | Nguyen et al. |
| 6,233,389 B1 | 5/2001 | Barton |
| 6,243,676 B1 | 6/2001 | Witteman |
| 6,278,837 B1 | 8/2001 | Yasukohchi et al. |
| 6,285,824 B1 | 9/2001 | Yanagihara et al. |
| 6,304,714 B1 | 10/2001 | Krause et al. |
| 6,330,675 B1 | 12/2001 | Wiser et al. |
| 6,335,730 B1 | 1/2002 | Gould |
| 6,341,195 B1 | 1/2002 | Mankovitz et al. |
| D454,574 S | 3/2002 | Wasko et al. |
| 6,400,407 B1 | 6/2002 | Zigmond et al. |
| 6,404,977 B1 | 6/2002 | Iggulden |
| 6,408,128 B1 | 6/2002 | Abecassis |
| 6,424,791 B1 | 7/2002 | Saib |
| 6,425,127 B1* | 7/2002 | Bates et al. ............... 725/32 |
| 6,445,738 B1 | 9/2002 | Zdepski et al. |
| 6,445,872 B1 | 9/2002 | Sano et al. |
| 6,452,615 B1 | 9/2002 | Chiu et al. |
| 6,490,000 B1 | 12/2002 | Schaefer et al. |
| 6,498,894 B2 | 12/2002 | Ito et al. |
| 6,504,990 B1 | 1/2003 | Abecassis |
| D470,153 S | 2/2003 | Billmaier et al. |
| 6,529,685 B2 | 3/2003 | Ottesen et al. |
| 6,542,695 B1 | 4/2003 | Akiba et al. |
| 6,553,178 B2 | 4/2003 | Abecassis |
| 6,574,594 B2 | 6/2003 | Pitman |
| 6,597,405 B1 | 7/2003 | Iggulden |
| 6,677,967 B2 | 1/2004 | Sawano et al. |
| 6,698,020 B1 | 2/2004 | Zigmond et al. |
| 6,701,355 B1 | 3/2004 | Brandt et al. |
| 6,718,551 B1 | 4/2004 | Swix et al. |
| 6,760,017 B1 | 7/2004 | Banerjee et al. |
| 6,771,316 B1 | 8/2004 | Iggulden |
| 6,788,882 B1 | 9/2004 | Geer et al. |
| D499,740 S | 12/2004 | Ombao et al. |
| 6,850,691 B1 | 2/2005 | Stam et al. |
| 6,856,758 B2 | 2/2005 | Iggulden |
| 6,871,006 B1 | 3/2005 | Oguz et al. |
| 6,931,451 B1 | 8/2005 | Logan |
| 6,978,470 B2 | 12/2005 | Swix et al. |
| 7,032,177 B2 | 4/2006 | Novak |
| 7,032,179 B2 | 4/2006 | Mack et al. |
| D521,521 S | 5/2006 | Jewitt et al. |
| 7,055,166 B1 | 5/2006 | Logan |
| 7,058,376 B2 | 6/2006 | Logan |
| 7,072,849 B1 | 7/2006 | Filepp et al. |
| 7,110,658 B1 | 9/2006 | Iggulden et al. |
| 7,187,884 B2 | 3/2007 | Bardolatzy et al. |
| 7,197,758 B1 | 3/2007 | Blackketter et al. |
| D539,809 S | 4/2007 | Totten et al. |
| 7,243,362 B2 | 7/2007 | Swix et al. |
| 7,251,413 B2 | 7/2007 | Dow et al. |
| 7,266,832 B2 | 9/2007 | Miller |
| 7,269,330 B1 | 9/2007 | Iggulden |
| 7,272,298 B1 | 9/2007 | Lang et al. |
| D554,140 S | 10/2007 | Armendariz |
| D558,220 S | 12/2007 | Maitlen et al. |
| 7,319,761 B2 | 1/2008 | Bianchi et al. |
| 7,320,137 B1 | 1/2008 | Novak |
| 7,376,469 B2 | 5/2008 | Eischeid et al. |
| 7,421,729 B2 | 9/2008 | Zenoni |
| 7,430,360 B2 | 9/2008 | Abecassis |
| D596,646 S | 7/2009 | Wani |
| D604,308 S | 11/2009 | Takano |
| 7,631,331 B2 | 12/2009 | Sie |
| 7,634,785 B2 | 12/2009 | Smith |
| 7,661,121 B2 | 2/2010 | Smith |
| 7,801,910 B2 | 9/2010 | Houh et al. |
| 7,889,964 B1 | 2/2011 | Barton et al. |
| 2002/0069218 A1 | 6/2002 | Sull et al. |
| 2002/0088010 A1* | 7/2002 | Dudkiewicz et al. ......... 725/138 |
| 2002/0090198 A1 | 7/2002 | Rosenberg et al. |
| 2002/0092017 A1 | 7/2002 | Klosterman |
| 2002/0092022 A1 | 7/2002 | Dudkicwicz |
| 2002/0097235 A1 | 7/2002 | Rosenberg et al. |
| 2002/0120925 A1 | 8/2002 | Logan |
| 2002/0124249 A1 | 9/2002 | Shintani et al. |
| 2002/0131511 A1 | 9/2002 | Zenoni |
| 2002/0169540 A1 | 11/2002 | Engstrom |
| 2002/0184047 A1 | 12/2002 | Plotnick |
| 2003/0005052 A1 | 1/2003 | Feuer |
| 2003/0031455 A1 | 2/2003 | Sagar |
| 2003/0031458 A1 | 2/2003 | Takahashi |
| 2003/0066078 A1 | 4/2003 | Bjorgan et al. |
| 2003/0084451 A1 | 5/2003 | Pierzga |
| 2003/0093790 A1 | 5/2003 | Logan |
| 2003/0154128 A1 | 8/2003 | Liga |
| 2003/0192060 A1 | 10/2003 | Levy |
| 2003/0194213 A1 | 10/2003 | Schultz et al. |
| 2003/0202773 A1 | 10/2003 | Dow et al. |
| 2003/0231854 A1 | 12/2003 | Derrenberger |
| 2004/0010807 A1 | 1/2004 | Urdang et al. |
| 2004/0040042 A1 | 2/2004 | Feinleib |
| 2004/0049780 A1* | 3/2004 | Gee ................... 725/32 |
| 2004/0083484 A1 | 4/2004 | Ryal |
| 2004/0172650 A1 | 9/2004 | Hawkins et al. |
| 2004/0177317 A1 | 9/2004 | Bradstreet |
| 2004/0189873 A1 | 9/2004 | Konig |
| 2004/0190853 A1 | 9/2004 | Dow et al. |
| 2004/0226035 A1 | 11/2004 | Hauser, Jr. |
| 2004/0244035 A1 | 12/2004 | Wright et al. |
| 2004/0255330 A1 | 12/2004 | Logan |
| 2004/0255334 A1 | 12/2004 | Logan |
| 2004/0255336 A1 | 12/2004 | Logan |
| 2005/0005308 A1 | 1/2005 | Logan |
| 2005/0020223 A1* | 1/2005 | Ellis et al. ............. 455/186.1 |
| 2005/0025469 A1 | 2/2005 | Geer |
| 2005/0044561 A1 | 2/2005 | McDonald |
| 2005/0076359 A1 | 4/2005 | Pierson et al. |
| 2005/0081252 A1 | 4/2005 | Chefalas et al. |
| 2005/0132418 A1 | 6/2005 | Barton |
| 2005/0262539 A1 | 11/2005 | Barton et al. |
| 2006/0013555 A1 | 1/2006 | Poslinski |
| 2006/0015925 A1 | 1/2006 | Logan |
| 2006/0059426 A1 | 3/2006 | Ogikubo |
| 2006/0115058 A1 | 6/2006 | Alexander et al. |
| 2006/0143567 A1 | 6/2006 | Chiu et al. |
| 2006/0168630 A1 | 7/2006 | Davies |
| 2006/0218617 A1 | 9/2006 | Bradstreet et al. |
| 2006/0277564 A1 | 12/2006 | Jarman |
| 2006/0277569 A1* | 12/2006 | Smith .................. 725/35 |
| 2006/0280437 A1 | 12/2006 | Logan |
| 2006/0288374 A1 | 12/2006 | Ferris et al. |
| 2006/0288392 A1 | 12/2006 | Fleming |
| 2007/0050827 A1 | 3/2007 | Gibbon |
| 2007/0101394 A1 | 5/2007 | Fu et al. |
| 2007/0113250 A1 | 5/2007 | Logan |
| 2007/0124758 A1 | 5/2007 | Sung |
| 2007/0136742 A1 | 6/2007 | Sparrell |

(56) References Cited

U.S. PATENT DOCUMENTS

| | | | |
|---|---|---|---|
| 2007/0156739 | A1 | 7/2007 | Black |
| 2007/0168543 | A1 | 7/2007 | Krikorian et al. |
| 2007/0199013 | A1 | 8/2007 | Samari et al. |
| 2007/0204288 | A1* | 8/2007 | Candelore ................... 725/28 |
| 2007/0212030 | A1 | 9/2007 | Koga et al. |
| 2007/0214473 | A1 | 9/2007 | Barton |
| 2007/0276926 | A1 | 11/2007 | LaJoie |
| 2007/0300249 | A1 | 12/2007 | Smith et al. |
| 2007/0300250 | A1 | 12/2007 | Smith et al. |
| 2007/0300258 | A1 | 12/2007 | O'Connor |
| 2008/0013927 | A1 | 1/2008 | Kelly et al. |
| 2008/0036917 | A1 | 2/2008 | Pascarella |
| 2008/0052739 | A1 | 2/2008 | Logan |
| 2008/0059997 | A1 | 3/2008 | Plotnick et al. |
| 2008/0112690 | A1 | 5/2008 | Shahraray |
| 2008/0155627 | A1 | 6/2008 | O'Connor |
| 2008/0183587 | A1 | 7/2008 | Joo et al. |
| 2008/0250450 | A1 | 10/2008 | Larner et al. |
| 2008/0267584 | A1 | 10/2008 | Green |
| 2008/0276266 | A1 | 11/2008 | Huchital et al. |
| 2009/0093278 | A1 | 4/2009 | Negron et al. |
| 2009/0271826 | A1 | 10/2009 | Lee et al. |
| 2009/0304358 | A1 | 12/2009 | Rashkovskiy |
| 2010/0031162 | A1 | 2/2010 | Wiser et al. |
| 2010/0138761 | A1 | 6/2010 | Barnes |
| 2011/0194838 | A1 | 8/2011 | Meijer |
| 2011/0197224 | A1 | 8/2011 | Meijer |

FOREIGN PATENT DOCUMENTS

| | | |
|---|---|---|
| EP | 625858 | 11/1994 |
| EP | 645929 | 3/1995 |
| EP | 726574 | 8/1996 |
| EP | 785675 | 7/1997 |
| EP | 817483 | 1/1998 |
| EP | 1536362 | 6/2005 |
| EP | 1705908 | 9/2006 |
| EP | 2061239 A2 | 5/2009 |
| GB | 2222742 | 3/1990 |
| GB | 2320637 | 6/1998 |
| JP | 06-233234 | 8/1994 |
| JP | 06-245157 | 9/1994 |
| JP | 07-111629 | 4/1995 |
| JP | 07-131754 | 5/1995 |
| JP | 07-250305 | 9/1995 |
| JP | 07-264529 | 10/1995 |
| JP | 2001 359079 | 12/2001 |
| JP | 2003153114 | 5/2003 |
| JP | 2006 262057 | 9/2006 |
| JP | 2008 131150 | 6/2008 |
| WO | WO 92/22983 | 12/1992 |
| WO | WO 95/09509 | 4/1995 |
| WO | WO 95/32584 | 11/1995 |
| WO | WO 01/22729 | 3/2001 |
| WO | 0223903 A | 3/2002 |

OTHER PUBLICATIONS

Casagrande, Steven; U.S. Appl. No. 12/434,742, filed May 4, 2009.
Casagrande, Steven; U.S. Appl. No. 12/434,746, filed May 4, 2009.
Casagrande, Steven; U.S. Appl. No. 12/434,751, filed May 4, 2009.
International Search Report for PCT/US2009/037183 mailed on Jul. 15, 2009.
Casagrande, Steven; U.S. Appl. No. 12/486,641, filed Jun. 17, 2009.
International Search Report for PCT/US2009/069019 mailed on Apr. 14, 2010.
International Search Report for PCT/US2010/038836 mailed on Oct. 1, 2010.
OA mailed on Oct. 27, 2010 for U.S. Appl. No. 12/130,792, filed May 30, 2008 in the name of Casagrande.
Final OA mailed on Nov. 16, 2010 for U.S. Appl. No. 11/942,896, filed Nov. 20, 2007 in the name of Hodge.
OA mailed on Nov. 29, 2010 for U.S. Appl. No. 12/135,360, filed Jun. 9, 2008 in the name of Casagrande.
Casagrande, Steven Michael, U.S. Appl. No. 11/942,111, filed Nov. 19, 2007.
Hodge, Kenneth Robert, U.S. Appl. No. 11/942,896, filed Nov. 20, 2007.
Casagrande, Steven Michael, U.S. Appl. No. 11/942,901, filed Nov. 20, 2007.
"Comskip", http://www.kaashoek.com/comskip/, commercial detector,(Jan. 26, 2007).
Dimitrova, N., Jeanin, S., Nesvadba J., McGee T., Agnihotri L., and Mekenkamp G., "Real Time Commercial Detection Using MPEG Features", Philips Research.
"*Paramount Pictures Corp.* v. *ReplayTV & SonicBlue*", http://www.eff.org/IP/Video/Paramount v. ReplayTV/20011031_complaint.html, Complaint filed, (Oct. 30, 2001).
Haughey, Matt "EFF's ReplayTV Suit Ends", http://www.pvrblog.com/pvr/2004/01/effs_replaytv_s.html, pvr.org, (Jan. 12, 2004).
"How to Write a New Method of Commercial Detection", MythTV, http://www.mythtv.org/wiki/index.php/How to Write a New Method of Commercial Detection, (Jan. 26, 2007).
Manjoo, Farhad "They Know What You're Watching", Wired News, http://www.wired.com/news/politics/0.1283.52302.00.html, Technology web page, (May 3, 2002).
Mizutani, Masami et al., "Commercial Detection in Heterogeneous Video Streams Using Fused Multi-Modal and Temporal Features", IEEE ICASSP, 2005, Philadelphia, (Mar. 22, 2005).
RCA, "RCA DRC8060N DVD Recorder", http://www.pricegrabber.com/rating_getprodrev.php/product_id=12462074/id ..., PriceGrabber.com, (Jan. 26, 2007).
Tew, Chris "How MythTV Detects Commercials", http://www.pvrwire.com/2006/10/27/how-mythtv-detects-commercials/, (Oct. 27, 2006).
U.S. Appl. No. 12/130,792, filed May 30, 2008 in the name of Steven M. Casagrande.
U.S. Appl. No. 12/135,360, filed Jun. 9, 2008 in the name of Steven M. Casagrande.
In the U.S. Appl. No. 11/942,111. Non-Final Office Action dated Jun. 2, 2011, 16 pages.
In the U.S. Appl. No. 11/942,901, Non-Final Office Action dated Jun. 7, 2011, 12 pages.
In the U.S. Appl. No. 12/130,792, Final Office Action dated Apr. 14, 2011. 14 pages; and Advisory Action dated Jul. 1, 2011, 2 pages.
In the U.S. Appl. No. 12/135,360, Final Office Action dated Apr. 27, 2011, 20 pages.
Invitation to Pay Fees and Partial Search Report for PCT/EP2011/051335 dated May 16, 2011, 7 pages.
Satterwhite et al., "Automatic Detection of TV Commercials." Potentials, IEEE 2004; 23(2):9-12.
Casagrande "Office Action Response" filed Sep. 2, 2011 for U.S. Appl. No. 11/942,111.
Casagrande "Office Action Response" filed on Sep. 7, 2011 for U.S. Appl. No. 11/942,901.
USPTO "Notice of Allowance" mailed on Sep. 27, 2011 for U.S. Appl. No. 11/942,901 in the name of Casagrande.
USPTO "Notice of Allowance" mailed on Oct. 14, 2011 for U.S. Appl. No. 11/942,111 in the name of Casagrande.
China State Intellectual Property Office "First Office Action" mailed on Oct. 28, 2011 for Chinese Application No. 200980109447.X.
Canadian Intellectual Property Office "Office Action" mailed on Jun. 27, 2011 for Canadian Application 2,665,855.
USPTO "Non-Final Office Action" mailed Jan. 30, 2012 for U.S. Appl. No. 12/486,641 in the name of Casagrande.
USPTO "Notice of Allowance" mailed Dec. 5, 2011 for U.S. Appl. No. 12/130,792 in the name of Casagrande.
USPTO "Non-Final Office Action" mailed Feb. 7, 2012 for U.S. Appl. No. 12/434,742 in the name of Casagrande.
USPTO "Non-Final Office Action" mailed Feb. 13, 2012 for U.S. Appl. No. 12/434,746 in the name of Casagrande.
USPTO "Non-Final Office Action" mailed Feb. 16, 2012 for U.S. Appl. No. 12/434,751 in the name of Casagrande.
USPTO "Notice of Allowance" mailed Jan. 27, 2012 for U.S. Appl. No. 11/942,896 in the name of Hodge.
Australian Patent Office "Office Action" mailed on Jun. 9, 2011 for Australian Application No. 2009225834.

(56) References Cited

OTHER PUBLICATIONS

Canadian Intellectual Property Office "Office Action" mailed on Aug. 31, 2011 for Canadian Application 2,717,933.
Casagrande "Office Action Response" filed Aug. 15, 2011 for U.S. Appl. No. 12/130,792.
USPTO "Advisory Action" mailed Jul. 1, 2011 for U.S. Appl. No. 12/130,792 in the name of Casagrande.
Casagrande "Office Action Response" filed Aug. 15, 2011 for U.S. Appl. No. 12/135,360.
Casagrande "Office Action Response" filed Jun. 13, 2011 for U.S. Appl. No. 12/130,792.
USPTO "Non-Final Office Action" mailed Oct. 3, 2011 for U.S. Appl. No. 11/942,896 in the name of Hodge.
USPTO "Final Office Action" mailed Apr. 14, 2011 for U.S. Appl. No. 12/130,792 in the name of Casagrande.
USPTO "Final Office Action" mailed Apr. 27, 2011 for U.S. Appl. No. 12/135,360 in the name of Casagrande.
USPTO "Non-Final Office Action" mailed Jun. 2, 2011 for U.S. Appl. No. 11/942,111 in the name of Casagrande.
Satterwhite Brandon et al. "Automatic Detection of TV Commercials" IEEE Potentials, Apr./May 2004.
USPTO "Non-Final Office Action" mailed Jun. 7, 2011 for U.S. Appl. No. 11/942,901 in the name of Casagrande.
European Patent Office "Inviatation to Pay Additional Fees and Partial Search Report" mailed May 16, 2011 for International Appln. PCT/EP2011/051335 filed Jan. 31, 2011.
USPTO "Non-Final Office Action" mailed Sep. 6, 2012 for U.S. Appl. No. 12/135,360, filed Jun. 9, 2008.
European Patent Office "Extended European Search Report" mailed Feb. 24, 2012; European Patent Appln. No. 08169362.4.
Canadian Intellectual Property Office, "Office Action" mailed Feb. 27, 2012; Canadian Appln. No. 2,665,850.
USPTO "Final Office Action" mailed May 10, 2012; U.S. Appl. No. 12/486,641, filed Jun. 17, 2009.
Australian Patent Office "Patent Examination Report No. 2" mailed Jul. 12, 2012 for AU Patent Appln. 2009225834.
USPTO "Final Office Action" mailed Aug. 1, 2012 for U.S. Appl. No. 12/434,751, filed May 4, 2009.
USPTO "Final Office Action" mailed Jul. 19, 2012 for U.S. Appl. No. 12/434,742, filed May 4, 2009.
Japan Patent Office "Notice of Rejection Ground" mailed Sep. 4, 2012 for Japanese Patent Appln. No. 2011-500879.
Canadian Patent Office "Office Action" mailed Jul. 23, 2012 for Canadian Patent Appln. No. 2,717,933.
USPTO "Non-Final Office Action" mailed Oct. 16, 2012 for U.S. Appl. No. 12/486,641, filed Jun. 17, 2009.
China State Intellectual Property Office "Office Action" mailed Sep. 24, 2012 for China Appln. No. 200980109447.X.
Pogue, David "Networks Start to Offer TV on the Web" The New York Times, Oct. 18, 2007; retrieved from the Internet at http://www.nytimes.com/007/10/18/technology/circuits/18pogue.html?pagewanted=print on Aug. 1, 2012.
TIVO "TIVO Launches Remote Scheduling With Verizon Wireless," Mar. 14, 2007.
Associated Press "AT&T Lets Mobile Phones Control Your Television," Mar. 6, 2007.
Canadian Intellectual Property Office "Office Action" dated Dec. 5, 2012 for Canadian Patent Appln. No. 2,665,855.
USPTO "Final Office Action" mailed Oct. 17, 2012 for U.S. Appl. No. 12/703,049, filed Dec. 9, 2010.
USPTO "Final Office Action" mailed Jan. 24, 2013 for U.S. Appl. No. 12/486,641, filed Jun. 17, 2009.
USPTO "Notice of Allowance" mailed Jan. 18, 2013 for U.S. Appl. No. 12/434,742, filed May 4, 2009.
USPTO "Notice of Allowance" dated Feb. 1, 2013 for U.S. Appl. No. 12/434,751.
China State Intellectual Property Office "Office Action" dated Feb. 4, 2013 for Chinese Patent Appln. No. 200980109447.X.
USPTO "Final Office Action" dated Feb. 4, 2013 for U.S. Appl. No. 12/434,746.
USPTO "Final Office Action" dated Mar. 28, 2013 for U.S. Appl. No. 12/135,360.
USPTO "Notice of Allowance" dated Mar. 26, 2013 for U.S. Appl. No. 12/486,641.
European Patent Office, Examination Report, dated Aug. 16, 2013 for European Patent Application No. 09801627.2.
European Patent Office, Examination Report, dated Aug. 16, 2013 for European Patent Application No. 11152790.9.
European Patent Office, Examination Report, dated Aug. 21, 2013 for European Patent Application No. 10732771.0.
USPTO, Non-Final Office Action, dated Sep. 4, 2013 for U.S. Appl. No. 13/407,955.
USPTO, Notice of Allowance, dated Sep. 13, 2013 for U.S. Appl. No. 12/434,746.

\* cited by examiner

METHOD AND APPARATUS FOR REPLACEMENT OF AUDIO DATA IN RECORDED AUDIO/VIDEO STREAM

BACKGROUND

Since the advent of the video cassette recorder (VCR), viewers of transmitted video and audio programming have been able to privately record their favorite programs. As a result, such technology has allowed the viewer to "time-shift" television programs of interest to a subsequent, more convenient time. More recently, digital video recorder (DVR) units, often provided in satellite and cable television receivers, or "set-top boxes," have supplied the viewer a more convenient means of time-shifting audio/video streams by allowing a larger number of programs to be recorded in a more automated fashion without the use of removable storage media.

Given this time-shifting capability and the amount of data storage available in such devices, users often do not view a recorded program or other audio/video stream until several days, or even weeks, after the stream was first recorded. As a result, some information provided in the audio/video stream, such as the subject matter of the program of interest, or even the informational content of a commercial, may be outdated by the time the user finally views the recorded stream.

DETAILED DESCRIPTION

Figure 1:
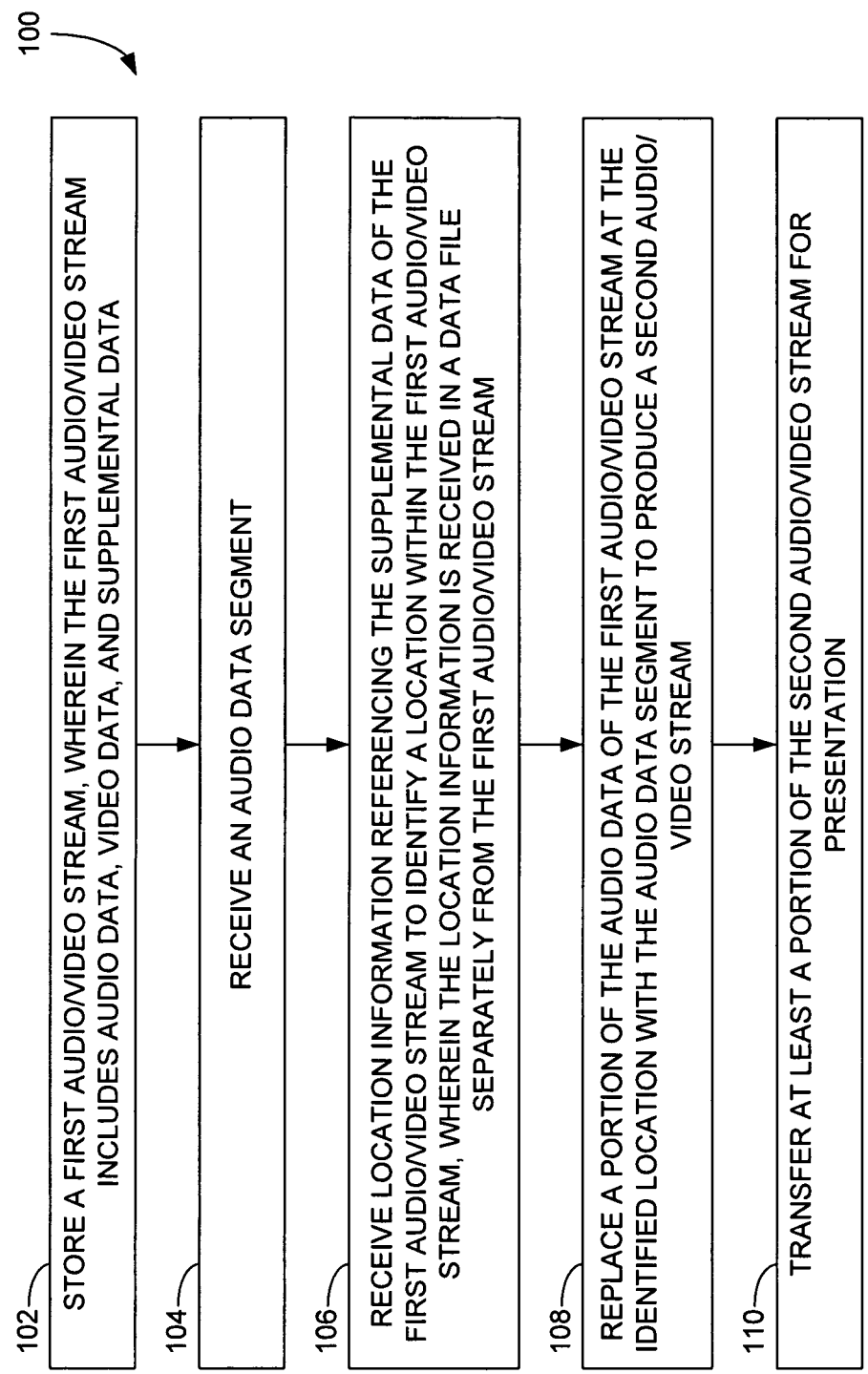
FIG. 1 is a flow diagram of a method according to an embodiment of the invention for replacing audio data within a recorded audio/video stream.

FIG. 1 provides a flow diagram of a method 100 for replacing audio data within a recorded audio/video stream. Generally, an audio/video stream is a contiguous block of audio data and associated video data that may be transmitted to, and received by, an electronic device, such as a terrestrial ("over-the-air") television receiver, a cable television receiver, a satellite television receiver, a computer, a portable electronic device, or the like. The video data of the audio/video stream may include a contiguous series of video frames, while the audio data of the audio/video stream may include consecutive samples of audio information. Further, the audio/video stream may delivered by any transmission method, such as broadcast, multicast, simulcast, closed circuit, pay-per-view, point-to-point (by "streaming," file transfer, or other means), or other method. Additionally, the audio/video stream may be transmitted by way of any communication technology, such as by satellite, wire or optical cable, wireless, or other means. The audio/video stream may also be transferred over any type of communication network, such as the Internet or other wide area network, a local area network, a private network, a mobile communication system, a terrestrial television network, a cable television network, and a satellite television network.

In the method 100, a first audio/video stream that includes audio data, video data, and supplemental data is stored (operation 102). Also, an audio data segment is received (operation 104), as is location information (operation 106). The location information references the supplemental data of the first audio/video stream to identify a location within the stream. Also, the location information is received in a data file separately from the first audio/video stream. A portion of the audio data of the first audio/video stream is replaced at the identified location with the audio data segment to produce a second audio/video stream (operation 108). At least a portion of the second audio/video stream is transferred for presentation (operation 110).

Figure 2:
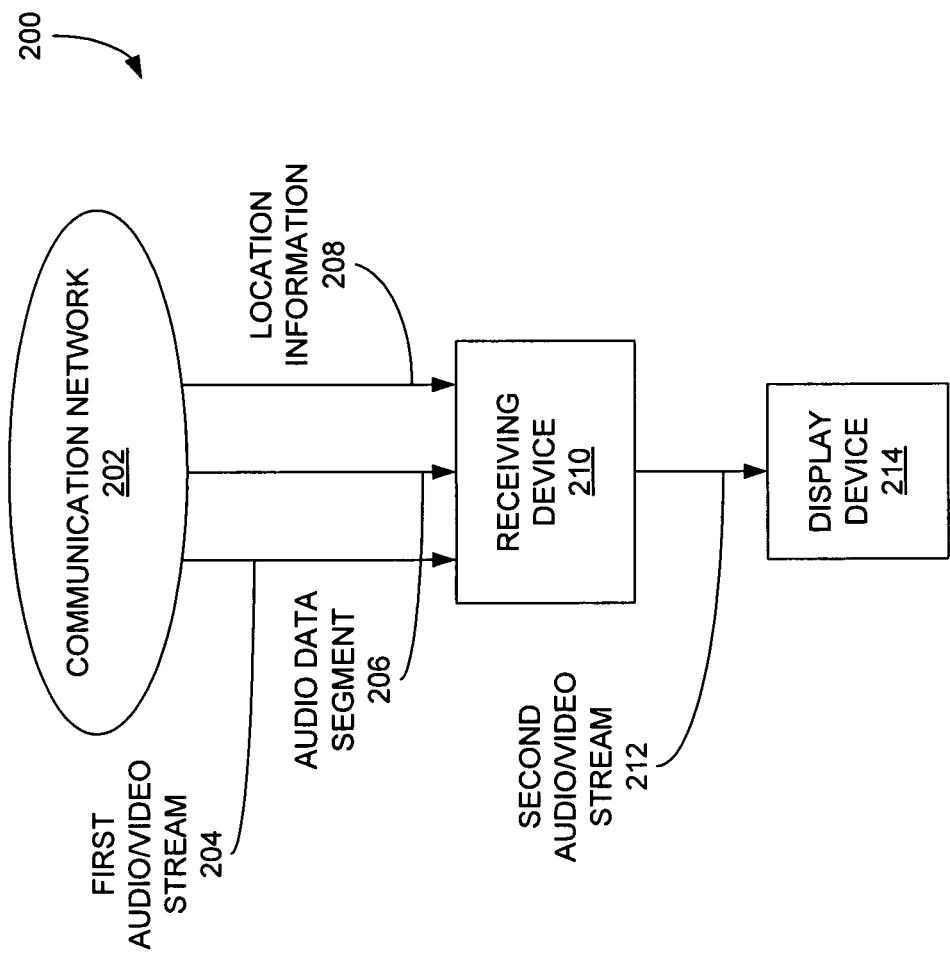
FIG. 2 is a block diagram of a system according to an embodiment of the invention configured to replace audio data within a contiguous block of audio/video data.

FIG. 2 presents an annotated block diagram of a system 200 for replacing audio data within a contiguous block of audio/video data according to another embodiment of the invention. The contiguous block is alternatively termed an audio/video stream, as employed above. The system 200 includes a communication network 202, a receiving device 210, and a display device 214.

The communication network 202 may be any communication network capable of transmitting an audio/video stream, such as a terrestrial over-the-air television network, a cable television network, a satellite television network (such as a direct broadcast satellite (DBS) system), a wide area network (WAN) (such as the Internet), a local area network (LAN), or the like. In another embodiment, the communication network 202 may be a combination of two or more network types listed above. Also, multiple components possibly included in the communication network 202, such as transmitters, repeaters, transponders, routers, and the like, are not shown in FIG. 2 to facilitate brevity in the following discussion.

The receiving device 210 of FIG. 2 may be any device capable of receiving an audio/video stream from the communication network 202. For example, in the case of the communication network 202 being a cable or satellite television network, the receiving device 210 may be a set-top box configured to communicate with the communication network 202. In another example, the receiving device 202 may be computer, a personal digital assistant (PDA), or similar device configured to communicate with the Internet or comparable communication network 202.

The display device 214 may be any device configured to receive an audio/video stream from the receiving device 210. Examples of the display device 214 include a television, a video monitor, or similar device capable of presenting audio and video information to a user. In some implementations, the display device 214 may be integrated within the receiving device. 210. For example, each of a computer, a PDA, and a mobile communication device may serve as both the receiving device 210 and the display device 214 by providing the capability of receiving audio/video streams from the communication network 202 and presenting the received audio/video streams to a user. In another implementation, a cable-ready television may include a converter device for receiving audio/video streams from the communication network 202 and displaying the streams to a user.

In the system 200, the communication network 202 transmits each of a first audio/video stream 204, an audio data segment 206, and location information 208 to the receiving device 210. The first audio/video stream 204 includes audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the Motion Picture Experts Group (MPEG) encoding standards, such as MPEG-2 or MPEG-4, as may be used in DBS systems and terrestrial Advanced Television Systems Committee (ATSC) systems. However, different audio and video data formats may be utilized in other implementations.

Also included in the first audio/video stream 204 is supplemental data providing information relevant to the audio data, the video data, or both, of the first audio/video stream 204. In one implementation, the supplemental data includes text data, such as closed captioning data, available for visual presentation to the user during the presentation of the associated audio and video data of the audio/video data stream 204. In one example, the text data may conform to any text data or closed captioning standard, such as the Electronic Industries Alliance 708 (EIA-708) standard employed in ATSC transmissions. When the text data is available to the display device 214, the user may configure the display device 214 to present the text data to the user in conjunction with the video data.

Each of a number of portions of the text data may be associated with a corresponding portion of the audio data or video data also included in the audio/video stream 204. For example, one or more frames of the video data of the audio/video stream 204 may be specifically identified with a portion of the text data included in the stream 204. As a result, multiple temporal locations within the audio/video stream 204 may be identified by way of an associated portion of the text data. For example, a particular text string or phrase within the text data may be associated with one or more specific frames of the video data within the same audio/video stream 204 so that the text string is presented to the user simultaneously with its associated video data frames. Therefore, the particular text string or phrase may provide an indication of a location of these video data frames, as well as the portion of the audio data synchronized or associated with the frames.

In another embodiment, the supplemental data may include timestamp data, wherein some or all of the video frames or audio data are associated with one of the timestamps. In one embodiment, some or all of the video frames are "marked" or labeled serially in presentation order. In this case, the supplemental data may also include a unique program identifier (UPID) for each separate program or event. Each audio/video stream may include one or more such programs and, thus, one or more UPIDs. Therefore, timestamp data, possibly in conjunction with a UPID, may also be utilized to identify a particular location within the first audio/video stream 204. The use of supplemental data to specify a location within the first audio/video stream 204 is discussed in greater detail below.

Figure 3:
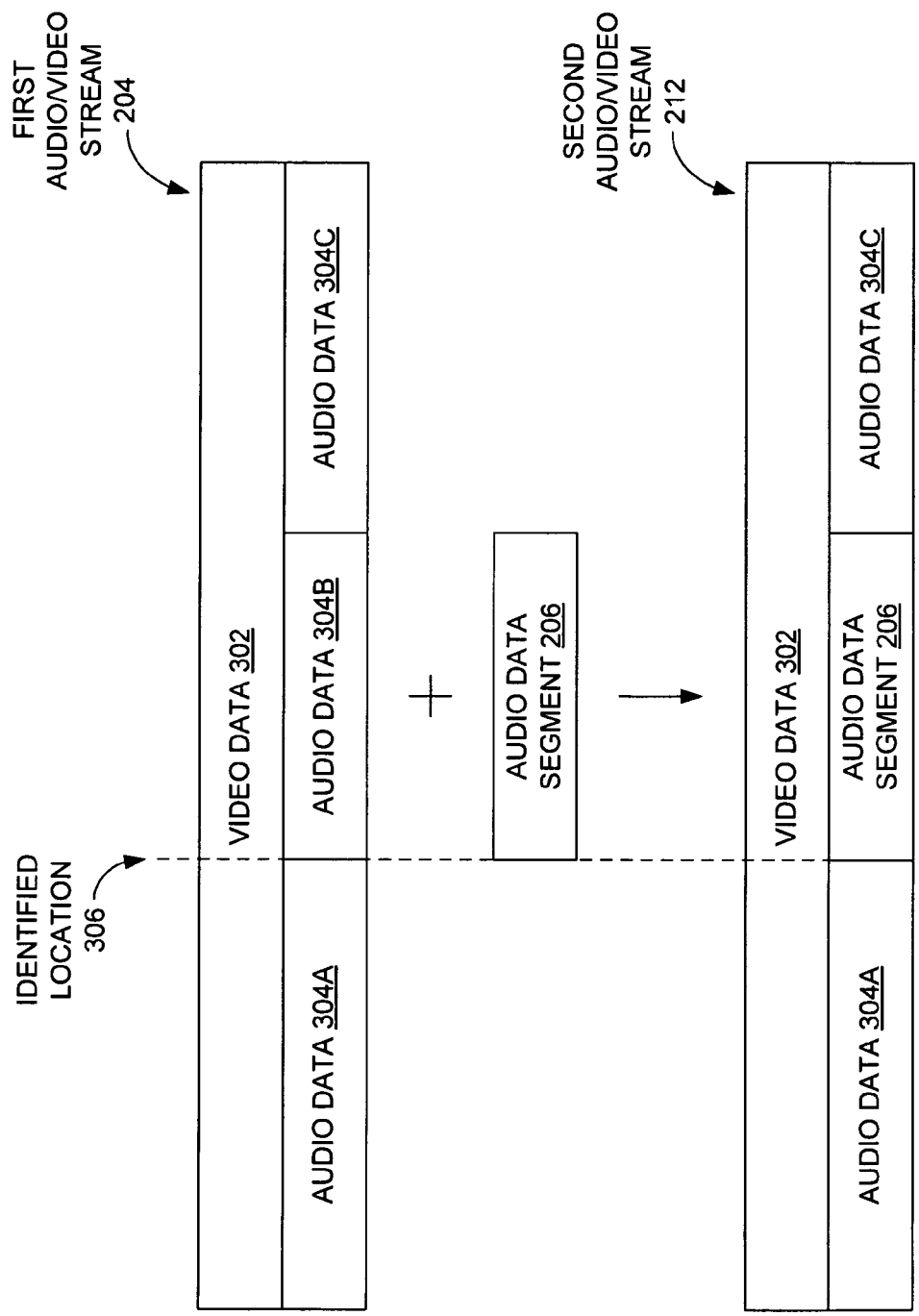
FIG. 3 is a graphical representation of an audio/video stream or contiguous block of audio/video data, and a version of the audio/video stream that is updated with replacement audio data, employing the system of FIG. 2.

The communication network 202 also transmits an audio data segment 206 and location information 208 to the receiving device 210. Generally, the audio data segment 206 is provided to replace or supplant some or all of the audio data of the first audio/video stream 204 at a location within the stream 204 designated by the location information 208. FIG. 3 provides a graphical representation of the first audio/video stream 204 received by the receiving device 210, and a second audio/video stream 212, as indicated in the system 200 of FIG. 2. The first audio/video stream 204 includes video data 302 and audio data 304. Also indicated is an identified location 306 within the first audio/video stream 204, which is indicated by way of the location information 208. The supplemental data of the audio/video stream 204 is not shown in FIG. 3 to simplify the diagram.

In the specific example of FIG. 3, the identified location 306 is the starting point at which the audio data segment 206 is to replace a portion of the audio data 304. In FIG. 3, the portion of the audio data 304 to be replaced is a second portion 304B, located after a first audio data portion 304A and before a third audio data portion 304C. While FIG. 3 employs the use of an starting point for the audio data segment 206 as the identified location 306 within the first audio/video stream 204, other locations, such as an ending point for the audio data segment 206, or both a starting point and an ending point, may be used in other implementations.

As a result of this audio replacement, a second audio/video stream 212 is produced, in which the audio data segment 206 replaces the second audio data portion 304B from the first audio/video stream 204. In one implementation, the audio data segment 206 is formatted according to the same formatting or encoding standard represented by the second audio data portion 304B. The remainder of the second audio/video stream 212 includes the video data 302, the first audio data portion 304A, and the third audio data portion 304C from the first audio/video stream 204.

To specify the identifying location 306, the location information 208 of FIG. 2 references a portion of the supplemental data of the first audio/video stream 204, such as the text data and/or timestamp data described above. In the case of text data, the text data of the first audio/video stream 204 may be perused to select a substantially unique portion or string within the text data that may be unambiguously detected at the receiving device 210. The text data may consist of a single character, several characters, an entire word, multiple consecutive words, or the like. In one embodiment, the selected text string may be located within the first audio/video stream 204 close to the location at which the audio data segment 206 is to reside. In one implementation, a human operator bears responsibility for selecting the text string. In other examples, the text string selection occurs automatically under computer control, or by way of human-computer interaction.

Figure 4:
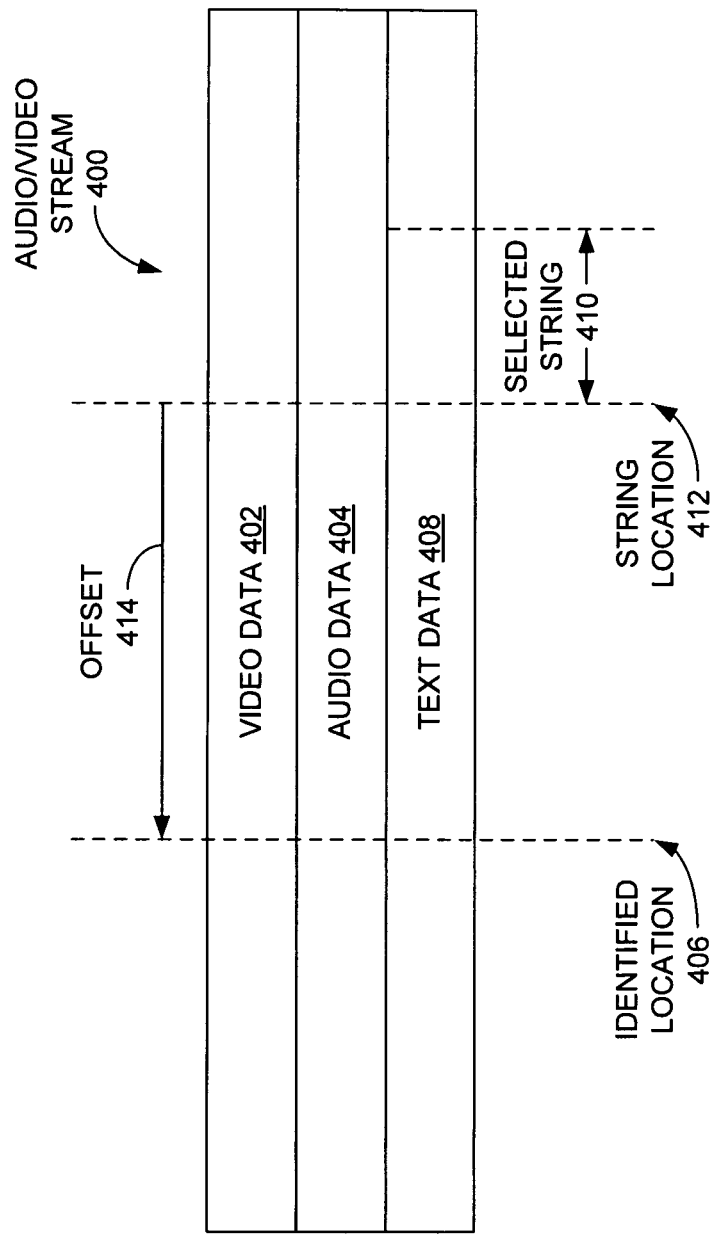
FIG. 4 is a graphical representation of the use of text data of an audio/video stream to identify a location in the audio/video stream for replacement of audio data according to an embodiment of the invention.

A node within the communication network 202 may then transmit the selected text string to the receiving device 210 as the location information 208. Further, if the selected text string is located a significant distance from the location to be indicated within the first audio/video stream 204, the location information 208 may include an offset. FIG. 4 depicts a situation in which a selected text string 410 within text data 408 of an audio/video stream 400 is located at string location 412, which is located in the audio/video stream 400 after the identified location 406 where replacement of a portion of the audio data 404 is to occur. An offset 414 may thus indicate the distance within the stream 204 between the location 412 of the selected text string 410 and the location 406 at which an audio data segment is to be placed. In this specific example, the direction of the offset 414 is toward the starting end of the audio/video stream 400, which may be indicated by way of a negative offset value. Oppositely, situations in which the selected text string is located in the associated audio/video stream prior to the identified location at which audio replacement is to occur may be indicated via a positive offset value.

In one example, the offset of the selected text string from the identified location may be stated relative to the video data of the audio/video stream, as the text data of the stream is often presented visually. However, the location of the selected text string may be stated relative to the audio data of the stream, or the stream in general, in other implementations. The offset may be expressed in any convenient unit capable of indicating a distance along the audio/video stream, such as a number of video frames, a length of time, or other value.

Returning to FIGS. 2 and 3, instead of employing text data, timestamp data within the supplemental data of the first audio/video stream 204 may be employed to specify the identified location 306 at which the audio data segment 206 is to be placed in the audio data 304 of the first audio/video stream 204. In one embodiment, each video frame of the first audio/video stream 204, or some subset of the video frames, may be associated with a unique timestamp. Further, the supplemental data may include a UPID identifying a particular program or broadcast event constituting at least a portion of the first audio/video stream 204. Thus, the UPID and the timestamp data may be employed in tandem to indicate the identified location 306 as specified in the location information 208.

Depending on the resiliency and other characteristics of the supplemental data, the node of the communication network 202 generating and transmitting the location information 208 may issue more than one instance of the location information 208 to the receiving device 210. For example, text data, such as closed captioning data, is often error-prone due to limited error correction capability protecting the text data. As a result, the receiving device 210 may not be able to detect some of the text data, including the text data selected for specifying the identified location 306. To address this issue, multiple unique text strings may be selected from the text data of the first audio/video stream 204 to indicate the identified location 306. The use of multiple text strings (each possibly accompanied with its own offset) may thus result in multiple sets of location information 208 transmitted over the communication network 202 to the receiving device, each of which is associated with the same audio data segment 206. Each set of location information 208 may be issued separately, or may be transmitted with one more other sets.

The audio data segment 206 and the location information 208 may be logically associated with one another to prevent incorrect association of the location information 208 with other audio data segments 206 being received at the receiving device 210. To this end, the audio data segment 206 may include an identifier or other indication associating the audio data segment 206 with its appropriate location information 208. Conversely, the location information 208 may include such an identifier, or both the audio data segment 206 and the location information 208 may do so. Use of an identifier may be appropriate in the case the audio data segment 206 and the location information 208 are transmitted separately, such as in separate data files. In another embodiment, the audio data segment 206 and the location information 208 may be packaged within the same transmission or data file to the receiving device 210 so that the receiving device 210 may identify the location information 208 with the audio data segment 206 on that basis.

Further, both the audio data segment 206 and the location information 208 may be associated with the first audio/video stream 204 to prevent any incorrect association of these data with another audio/video stream. Thus, an identifier, such as that discussed above, may be included with the first audio/video stream 204 to relate the stream 204 to its audio data segment 206 and location information 208. In one particular example, the identifier may be a UPID, mentioned earlier. Use of an identifier in this context addresses situations in which the audio data segment 206 and the location information 208 are created after the first audio-video stream 204 has been transmitted over the communication network 202 to the receiving device 210. In another scenario, the audio data segment 206 and the location information 208 may be available for transmission by the time the first audio/video stream 204 is transmitted. In this case, the communication network 202 may transmit the audio data segment 206 and the location information 208 with the first audio/video stream 204, thus associating all three sets of data 204, 206, 208. In one example, the audio data segment 206 and the location information 208 may be included as supplemental data within the first audio/video stream 204.

Once the receiving device 210 has received the first audio/video stream 204, the audio data segment 206, and the location information 208, the receiving device 210 may process this information to produce a second audio/video stream 212 for presentation to the display device 214. More specifically shown in FIG. 3, the second audio/video stream 212 includes the video data 302 of the first audio/video data stream 204, as well as most of the audio data 304 for the first stream 204. The portion of the audio data 304 located at the identified location 306 specified in the location information 308 is then replaced in the second audio/video stream 212 with the audio data segment 206. In the specific example of FIG. 3, the replaced portion of the audio data 304 is the second portion 304B, as described earlier. In other situations, other portions of the audio data 304, including all of the audio data 304, may be replaced. In other implementations, multiple segments of the audio data 304 may be supplanted, possible by different audio data segments 206, and indicated by separate sets of location information 208.

Figure 5:
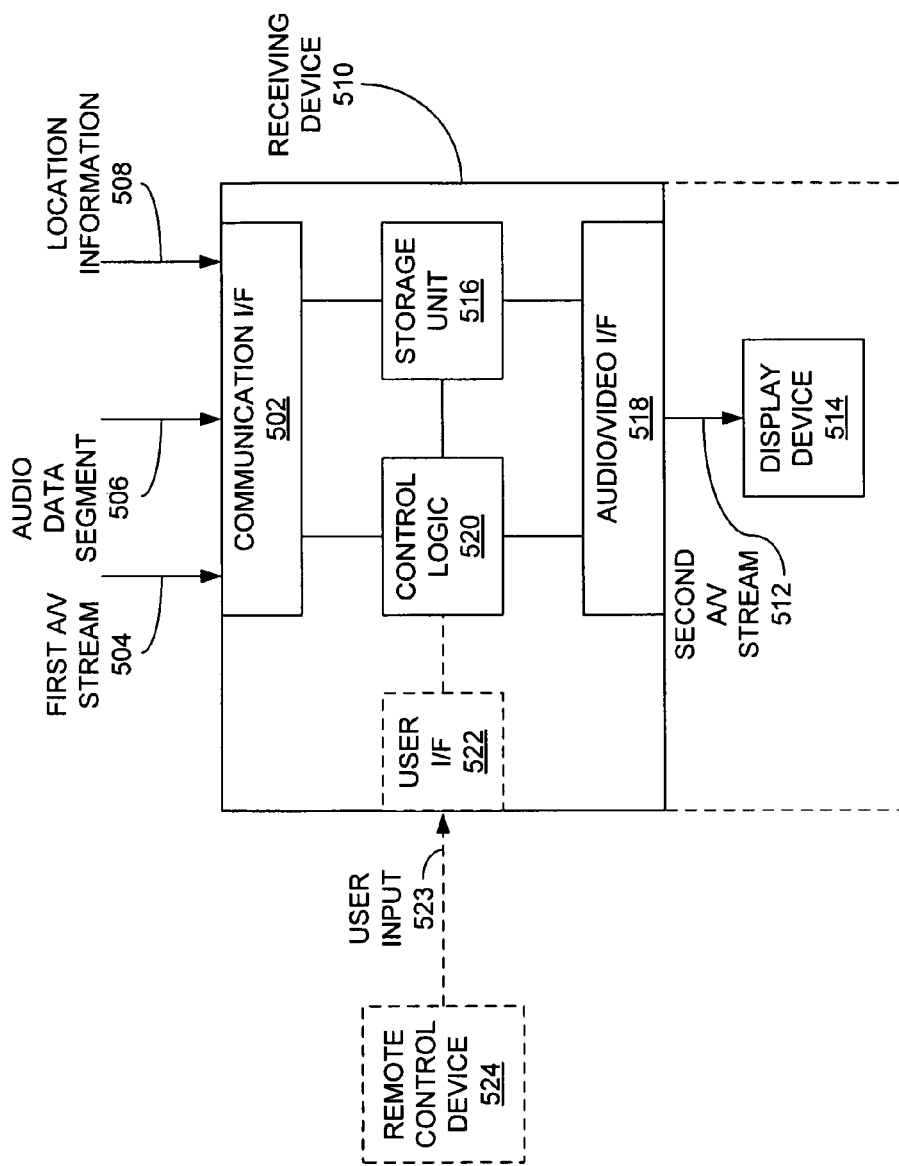
FIG. 5 is a block diagram of a receiving device according to an embodiment of the invention for replacing audio data within a recorded audio/video stream.

A more explicit view of a receiving device 510 according to one embodiment is portrayed in FIG. 5. The receiving device 510 includes a communication interface 502, a storage unit 516, an audio/video interface 518, and control logic 520. In some implementations, a user interface 522 may also be employed in the receiving device 510. Other components possibly included in the receiving device 510, such as demodulation circuitry, decoding logic, and the like, are not shown explicitly in FIG. 5 to facilitate the following discussion.

The communication interface 502 may include circuitry to receive a first audio/video stream 504, an audio data segment 506, and location information 508. For example, if the receiving device 510 is a satellite set-top box, the communication interface 502 may be configured to receive satellite programming, such as the first audio/video stream 402, via an antenna from a satellite transponder. If, instead, the receiving device 510 is a cable set-top box, the communication interface 502 may be operable to receive cable television signals and the like over a coaxial cable. In either case, the communication interface 502 may receive the audio data segment 506 and the location information 508 by employing the same technology used to receive the first audio/video stream 402. In another implementation, the communication interface 502 may receive the audio data segment 506 and the location information 508 by way of another communication technology, such as the Internet, a standard telephone network, or other means. Thus, the communication network 502 may employ one or more different communication technologies, including wired and wireless communication technologies, to communicate with a communication network, such as the communication network 202 of FIG. 2.

Coupled with the communication interface 502 is a storage unit 516, which is configured to store both the first audio/video stream 504 and the audio data segment 506. The storage unit 516 may include any storage component configured to store one or more such audio/video streams. Examples include, but are not limited to, a hard disk drive, an optical disk drive, and flash semiconductor memory. Further, the storage unit 516 may include either or both volatile and nonvolatile memory.

Communicatively coupled with the storage unit 516 is an audio/video interface 518, which is configured to transfer audio/video streams from the receiving unit 510 to a display device 514 for presentation to a user. The audio/video interface 518 may incorporate circuitry to transfer the audio/video streams in any format recognizable by the display device 514, including composite video, component video, the Digital Visual Interface (DVI), and the High-Definition Multimedia Interface (HDMI). The audio/video interface 518 may also incorporate circuitry to support multiple types of these or other audio/video formats. In one example, the display device 514, such as a television monitor or similar display component, may be incorporated within the receiving device 510, as indicated earlier.

In communication with the communication interface 502, the storage unit 516, and the audio/video interface 518 is control logic 520 configured to control the operation of each of these three components 502, 516, 518. In one implementation, the control logic 520 includes a processor, such as a microprocessor, microcontroller, digital signal processor (DSP), or the like for execution of software configured to perform the various control functions described herein. In another embodiment, the control logic 520 may include hardware logic circuitry in lieu of, or in addition to, a processor and related software to allow the control logic 520 to control the other components of the receiving device 510.

Optionally, the control logic 520 may communication with a user interface 522 configured to receive user input 523 directing the operation of the receiving device 510. The user input 523 may be generated by way of a remote control device 524, which may transmit the user input 523 to the user interface 522 by the use of, for example, infrared (IR) or ultra-high frequency (UHF) signals. In another embodiment, the user input 523 may be received more directly by the user interface 522 by way of a touchpad or other manual interface incorporated into the receiving device 510.

The receiving device 510, by way of the control logic 520, is configured to receive the first audio/video stream 504 by way of the communication interface 502, and store the audio/video stream 504 in the storage unit 516. The receiving device 510 is also configured to receive the audio data segment 506 over the communication interface 502, possibly storing the audio data segment 506 in the storage unit 516 as well. The location information 508 is also received at the communication interface 502, which may pass the location information 508 to the control logic 520 for processing. In another embodiment, the location information 508 may be stored in the storage unit 516 for subsequent retrieval and processing by the control logic 520.

At some point after the location information 508 is processed, the control logic 520 generates and transmits a second audio/video stream 512 over the audio/video interface 518 to the display device 514. In one embodiment, the control logic 520 generates and transmits the second audio/video stream 512 in response to the user input 523. For example, the user input 523 may command the receiving device 510 to transfer the first audio/video stream 504 to the display device 514 for presentation. In response, the control logic 520 instead generates and transmits the second audio/video stream 512. As described above in conjunction with FIG. 2, the second audio/video stream 512 includes the audio and video data of the first audio/video stream 504, but with the audio data segment 506 replacing the original audio data of the first audio/video stream 504 at the location specified in the location information 508, as described in detail above in conjunction with FIG. 3 with respect to the first audio/video stream 204 of FIG. 2.

Depending on the implementation, the second audio/video stream 512 may or may not be stored as a separate data structure in the storage unit 516. In one example, the control logic 520 generates and stores the entire second audio/video stream 512 in the storage unit 516. The control logic 520 may further overwrite the first audio/video stream 504 with the second audio/video stream 512 to save storage space within the storage unit 516. Otherwise, both the first audio/video stream 504 and the second audio/video stream 512 may reside within the storage unit 516.

In another implementation, the second audio/video stream 512 may not be stored separately within the storage unit 516. For example, the control logic 520 may instead generate the second audio/video stream 512 "on the fly" by transferring the audio data and the video data of the first audio/video stream 504 in presentation order from the storage unit 516 to the audio/video interface 518. At the point at which the audio data indicated by the location information 508 is to be transferred, the control logic 520 may then cause the audio data segment 506 to be transmitted from the storage unit 516, thus replacing the corresponding audio data from the first stream 504 at the audio/video interface 518. Once the last of the audio data segment 506 has been transferred from the storage unit 516, the control logic 520 may cause the remainder of the original audio data of the first stream 504 not replaced by the audio data segment 506 to be transferred to the audio/video interface 518 for presentation to the display device 514.

In one implementation, a user may select by way of the user input 523 whether the first audio/video stream 504 or the second audio/video stream 512 is transferred to the display device 514 by way of the audio/video interface 518. In another embodiment, a content provider of the first audio/video stream 504 may prevent the user from maintaining such control by way of additional information delivered to the receiving device 510.

If more than one audio data segment 506 is available in the storage unit 516 to replace a specified portion of the audio data of the first audio/video stream 504, the user may select via the user input 523 which of the audio data segments 506 are to replace the corresponding portion of the audio data of the first stream 504 upon transmission to the display device 514. Such a selection may be made in a menu system incorporated in the user interface 522 and presented to the user via the display device 514.

Figure 6:
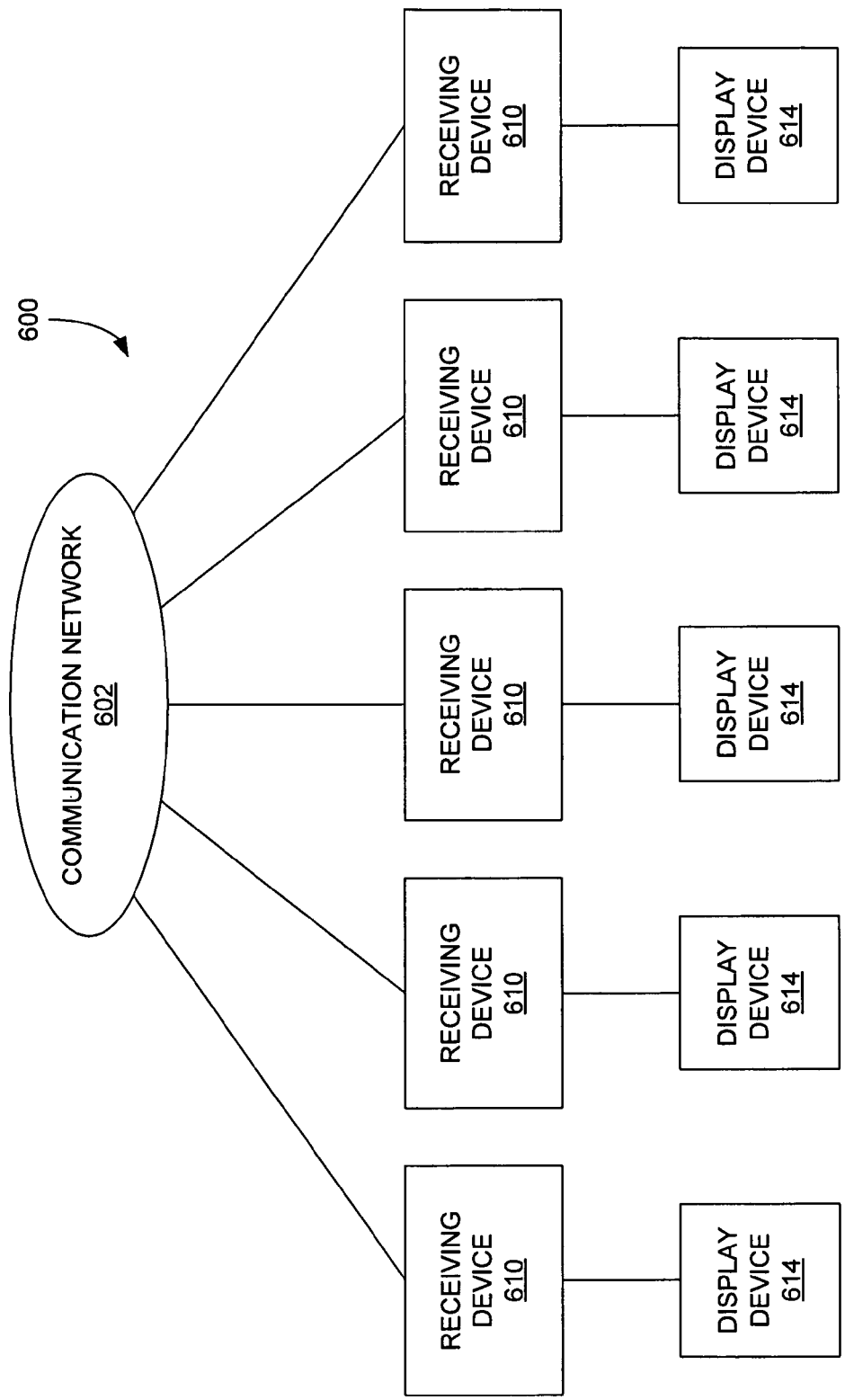
FIG. 6 is a block diagram of a system in which multiple receiving devices are communicatively coupled to a communication network according to an embodiment of the invention.

In a broadcast environment, such as that depicted in the system 600 of FIG. 6, multiple receiving devices 610 may be coupled with a communication network 602 to receive audio/video streams, any of which may be recorded, in whole or in part, by any of the receiving devices 610. In conjunction with any number of these audio/video streams, audio data segments serving as partial or total replacements for audio data in the streams, as well as the location information for each of the audio data segments, may be transferred to the multiple receiving units 610. In response to receiving the audio/video streams, each of the receiving units 610 may record any number of the audio/video streams received. For any audio data segments and associated location information that are transmitted over the communication network 602, each receiving device 610 may then review whether the received audio data segments and location information is associated with an audio/video stream currently stored in the device 610. If the associated stream is not stored therein, the receiving device 610 may delete or ignore the related audio data segment and location information received.

In another embodiment, instead of broadcasting each possible audio data segment and related location information, the transfer of an audio/video stream stored within the receiving device/unit 610 to an associated display device 614 may cause the receiving unit 610 to query the communication network 602 for any outstanding replacement audio data segments that apply to the stream to be presented. As a result, the broadcasting of each audio data segment and related location information would not be required, thus potentially reducing the amount of consumed bandwidth over the communication network 602.

Various embodiments as described herein may provide any of a number of benefits. Generally, the methods and systems disclosed above allow replacement of all or a portion of the audio content of an audio/video stream, such as a program or commercial message, after the audio/video stream has been recorded by the user. For example, a commercial message announcing a "this weekend only" sale that is originally broadcast during a recorded program may be obsolete by the time the user views the recorded program the following week. To address this problem, the audio portion of the commercial may be replaced with updated audio data announcing a future sale date or other more recent information. The same may be true of information presented in news, weather, and sports programs, as well as other types of audio/video streams.

Under another scenario, some programs may contain language that some users deem offensive or objectionable. To render the program palatable to a wider range of viewers, the content provider may make alternative audio segments of the audio portion of the program available. A user who has recorded the program may then select a milder form of the audio portion for viewing.

Similarly, some or all of the audio portion of an audio/video stream or program may be available in alternative languages. Again, a user may then indicate a language preference to the receiving device, which may then provide the appropriate audio data segments for that language in place of the original audio data upon presentation of the recorded audio/video stream to the user.

In each of these examples, the replacement audio data segment may be made available to the receiving device after the audio/video stream has been recorded at the device, thus providing a significant level of flexibility as to when the replacement audio data is provided.

While several embodiments of the invention have been discussed herein, other embodiments encompassed by the scope of the invention are possible. For example, while various embodiments have been described primarily within the context of satellite, cable, and terrestrial set-top boxes, other receiving devices capable of replacing portions of audio data of a recorded audio/video stream, such as computers, personal digital assistants (PDAs), and mobile communication devices, may be utilized in other embodiments. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method for replacing audio data within a recorded audio/video stream, the method comprising:
storing a first audio/video stream, wherein the first audio/video stream comprises audio data, video data, and closed captioning text data associated with the audio data;
receiving a first audio data segment;
receiving multiple sets of location information in one or more data files separately from the first audio/video stream, wherein the multiple sets of location information convey multiple unique text strings, each of the unique text strings selected from the closed captioning text data, and wherein each of the unique text strings is accompanied, in the one or more data files, with a corresponding offset value relative to a beginning location of the unique text string, and wherein each of the unique text strings is used to identify a different first respective location within the first audio/video stream, and wherein the different first respective location is offset by the corresponding offset value to indicate an identified location in the first audio/video stream, such that each unique text string and its accompanying offset value, in each of the multiple sets of location information, redundantly indicates the same identified location;
replacing, based on the multiple sets of location information, at least a portion of the audio data of the first audio/video stream at the identified location with the first audio data segment to produce a second audio/video stream; and
transferring at least a portion of the second audio/video stream for presentation.

2. The method of claim 1, further comprising:
before transferring the portion of the second audio/video stream, storing the second audio/video stream.

3. The method of claim 1, wherein the one or more data files are received after completing reception of the first audio/video stream.

4. The method of claim 1, further comprising:
receiving a second audio data segment; and
receiving a selection of one of the first audio data segment and the second audio data segment;
wherein replacing the portion of the audio data of the first audio/video stream is performed with either the first audio data segment or the second audio data segment according to the selection.

5. A method for replacing audio data within a contiguous block of audio/video data, comprising:
transmitting a contiguous block of audio/video data over a communication network to a receiving device, wherein the contiguous block comprises audio data, video data, and closed captioning text data associated with the audio data;
storing the contiguous block at the receiving device;
transmitting an audio data segment over the communication network to the receiving device;
transmitting multiple sets of location information over the communication network to the receiving device in multiple data files separately from the contiguous block such that each set of location information is transmitted separately, wherein each set of location information includes a respective text string associated with the closed captioning text data for one or more video data frames of the contiguous block and also includes a corresponding offset value that accompanies the respective text string and is relative to a beginning location of the respective text string, and wherein the respective text string is used to indicate a unique first location within the contiguous block, and wherein the unique first location is offset by the corresponding offset value to indicate an identified location within the contiguous block, such that each text string and its accompanying offset value, in each of the multiple sets of location information, redundantly indicates the same identified location;

replacing at least a portion of the audio data of the contiguous block at the identified location with the audio data segment to yield a second contiguous block; and transferring at least a portion of the second contiguous block from the receiving device to a display device.

6. The method of claim 5, wherein the receiving device comprises one of a terrestrial television receiver, a cable television receiver, a satellite television receiver, and a computer.

7. The method of claim 5, wherein the communication network comprises at least one of a terrestrial television network, a cable television network, a satellite television network, a wide area network, and a local area network.

8. A receiving device for replacing audio data within a recorded audio/video stream, the receiving device comprising:

a communication interface configured to receive a first audio/video stream, an audio data segment, and multiple sets of location information, wherein the first audio/video stream comprises audio data, video data, and closed captioning text data, and wherein each set of the location information is received in a different data file and separate from the first audio/video stream, and wherein each set of location information includes a different unique text string associated with the closed captioning text data for one or more video frames of the first audio/video stream, and wherein each unique text string is used to identify a different location within the first audio/video stream, and each unique text string accompanied with its own offset value in the corresponding set of location information, the offset value relative to a beginning location of the respective unique text string, wherein the different location is offset by the offset value to indicate an identified location in the first audio/video stream such that each unique text string and its accompanying offset value, in each set of the location information, redundantly indicates the same identified location;

a storage unit configured to store the first audio/video stream and the audio data segment;

an audio/video interface configured to transmit audio/video streams to a display device; and control logic configured to replace at least a portion of the audio data of the first audio/video stream at the identified location with the audio data segment to produce a second audio/video stream, and transfer at least a portion of the second audio/video stream to the audio/video interface.

9. The receiving device of claim 8, wherein the control logic is configured to store the second audio/video stream in the storage unit.

10. The receiving device of claim 8, further comprising:

a user interface configured to receive a user input;

wherein the control logic is configured to transfer the second audio/video stream to the audio/video interface based on the user input.

11. The receiving device of claim 8, further comprising:

a user interface configured to receive a user input;

wherein the communication interface is configured to receive a second audio data segment;

wherein the storage unit is configured to store the second audio data segment; and wherein the control logic is configured to replace the portion of the audio data of the first audio/video stream at the identified location plus the offset with either the first audio data segment or the second audio data segment based on the user input.

12. The receiving device of claim 8, further comprising the display device.

* * * * *